United States Patent [19]

Kinoshita et al.

[11] Patent Number: 5,517,401

[45] Date of Patent: May 14, 1996

[54] THREE LEVEL PULSE WIDTH MODULATED INVERTER FOR AN ELECTRIC VEHICLE

[75] Inventors: Shigenori Kinoshita; Takao Yanase; Kouetsu Fujita, all of Kawasaki, Japan

[73] Assignee: Fuji Electric Co., Ltd., Kanagawa, Japan

[21] Appl. No.: 355,325

[22] Filed: Dec. 12, 1994

Related U.S. Application Data

[63] Continuation-in-part of Ser. No. 10,784, Jan. 29, 1993, abandoned.

[30] Foreign Application Priority Data

Feb. 7, 1992 [JP] Japan ..................................... 4-056660
Apr. 27, 1992 [JP] Japan ..................................... 4-154066

[51] Int. Cl.[6] ............................................. H02M 7/5387
[52] U.S. Cl. ................................. 363/98; 363/132
[58] Field of Search ........................... 363/41, 132, 98

[56] References Cited

U.S. PATENT DOCUMENTS

| | | | |
|---|---|---|---|
| 4,447,786 | 5/1984 | Saar et al. | 363/41 |
| 4,953,069 | 8/1990 | Braun | 363/41 |
| 5,155,675 | 10/1992 | Maruyama et al. | 363/41 |
| 5,321,599 | 6/1994 | Tanamachi et al. | 363/41 |
| 5,361,196 | 11/1994 | Tanamachi et al. | 363/98 |
| 5,375,050 | 12/1994 | Nakata et al. | 363/41 |

OTHER PUBLICATIONS

Proceedings of the 30th Annual Conference On The IEEE Vehicular Technology Society, Sep. 1980, pp. 1–7, "AC Propulsion System For An Electric Vehicle", Geppert.

IEEE Transaction On Industry Applications, vol. 1A–17, No. 5, Sep., 1981 pp. 518–521, "A New Neutral–Point–Clamped PWM Inverter", Nabae et al.

4th International Conference on Power Electronics and Variable–Speed Drives, Jul., 1990, pp. 98–103, "PWM Control Of A Three–Level Inverter", Steinke.

Primary Examiner—Jeffrey L. Sterrett
Attorney, Agent, or Firm—Spencer & Frank

[57] ABSTRACT

An inverter converting by using semiconductor power switching devices a DC voltage supplied from a main battery to an AC voltage supplied to an AC motor. Unipolar switching devices such as MOSFETs are used as the power switching devices. The power switching devices are controlled so that the output voltage of the inverter is composed of pulses taking three levels in the operation range of high output power. This makes it possible to reduce the stationary loss and switching loss of the switching devices, and to increase the efficiency of the inverter.

4 Claims, 15 Drawing Sheets

FIG. 23

3 - LEVEL CONTROL: U - V LINE-TO-LINE VOLTAGE

| INTERVAL | [1] | | [2] | | [3] | | [4] | | [5] | | [6] | | [1] | | [2] | | [3] | |
|---|---|---|---|---|---|---|---|---|---|---|---|---|---|---|---|---|---|---|
| SUB-INTERVAL / SWITCHING DEVICES | A | B | C | D | A | B | A | B | C | D | A | B | A | B | C | D | A | B |
| 210 | | | O | | | | | | | | | | | | O | | | |
| 211 | O | | O | O | O | | | | | | | | O | | O | O | O | |
| 212 | | | | | | | O | | O | O | O | | | | | | | |
| 213 | | | | | | | | | | O | | | | | | | | |
| 210 (V) | | | | | | | O | O | O | O | O | O | | | | | | |
| 211 (V) | | | | | | | O | O | O | O | O | O | | | | | | |
| 212 (V) | O | O | O | O | O | O | | | | | | | O | O | O | O | O | O |
| 213 (V) | O | O | O | O | O | O | | | | | | | O | O | O | O | O | O |
| 210 (W) | | | | | | | | | | | | | | | | | | |
| 211 (W) | | | | | | | | | | | | | | | | | | |
| 212 (W) | | | | | | | | | | | | | | | | | | |
| 213 (W) | | | | | | | | | | | | | | | | | | |

FIG. 24

3 - LEVEL CONTROL: V - W LINE-TO-LINE VOLTAGE

| INTERVAL | [1] | | [2] | | [3] | | [4] | | [5] | | [6] | | [1] | | [2] | | [3] | |
|---|---|---|---|---|---|---|---|---|---|---|---|---|---|---|---|---|---|---|
| SUB-INTERVAL / SWITCHING DEVICES | A | B | C | D | A | B | A | B | C | D | A | B | A | B | C | D | A | B |
| 210 | | | | | | | | | | | | | | | | | | |
| 211 | | | | | | | | | | | | | | | | | | |
| 212 | | | | | | | | | | | | | | | | | | |
| 213 | | | | | | | | | | | | | | | | | | |
| 210 (V) | | | O | | | | | | | | | | | | O | | | |
| 211 (V) | O | | O | O | O | | | | | | | | O | | O | O | O | |
| 212 (V) | | | | | | | O | | O | O | O | | | | | | | |
| 213 (V) | | | | | | | | | | O | | | | | | | | |
| 210 (W) | | | | | | | O | O | O | O | O | O | | | | | | |
| 211 (W) | | | | | | | O | O | O | O | O | O | | | | | | |
| 212 (W) | O | O | O | O | O | O | | | | | | | O | O | O | O | O | O |
| 213 (W) | O | O | O | O | O | O | | | | | | | O | O | O | O | O | O |

FIG. 25

3 - LEVEL CONTROL: W - U LINE-TO-LINE VOLTAGE

| INTERVAL | [1] | | [2] | | [3] | | [4] | | [5] | | [6] | | [1] | | [2] | | [3] | |
|---|---|---|---|---|---|---|---|---|---|---|---|---|---|---|---|---|---|---|
| SUB-INTERVAL | A | B | C | D | A | B | A | B | C | D | A | B | A | B | C | D | A | B |
| SWITCHING DEVICES | | | | | | | | | | | | | | | | | | |
| 210 | | | | | | | ○ | ○ | ○ | ○ | ○ | ○ | | | | | | |
| 211 | | | | | | | ○ | ○ | ○ | ○ | ○ | ○ | | | | | | |
| 212 | ○ | ○ | ○ | ○ | ○ | ○ | | | | | | | ○ | ○ | ○ | ○ | ○ | ○ |
| 213 | ○ | ○ | ○ | ○ | ○ | ○ | | | | | | | ○ | ○ | ○ | ○ | ○ | ○ |
| 210 (V) | | | | | | | | | | | | | | | | | | |
| 211 (V) | | | | | | | | | | | | | | | | | | |
| 212 (V) | | | | | | | | | | | | | | | | | | |
| 213 (V) | | | | | | | | | | | | | | | | | | |
| 210 (W) | | ○ | | | | | | | | | | | | | | ○ | | |
| 211 (W) | ○ | | ○ | ○ | ○ | | | | | | | | | ○ | ○ | ○ | ○ | |
| 212 (W) | | | | | | | ○ | | ○ | ○ | ○ | | | | | | | |
| 213 (W) | | | | | | | | ○ | | | | | | | | | | |

FIG. 26

2 - LEVEL CONTROL (OUTPUT V₀/2): U - V LINE-TO-LINE VOLTAGE

| INTERVAL | [1] | | [2] | | [3] | | [4] | | [5] | | [6] | | [1] | | [2] | | [3] | |
|---|---|---|---|---|---|---|---|---|---|---|---|---|---|---|---|---|---|---|
| SUB-INTERVAL | A | B | A | B | A | B | A | B | A | B | A | B | A | B | A | B | A | B |
| SWITCHING DEVICES | | | | | | | | | | | | | | | | | | |
| 210 | | | | | | | | | | | | | | | | | | |
| 211 | ○ | | ○ | | ○ | | | | | | | | ○ | | ○ | | ○ | |
| 212 | | | | | | | ○ | | ○ | | ○ | | | | | | | |
| 213 | | | | | | | | | | | | | | | | | | |
| 210 (V) | | | | | | | ○ | ○ | ○ | ○ | ○ | ○ | | | | | | |
| 211 (V) | | | | | | | ○ | ○ | ○ | ○ | ○ | ○ | | | | | | |
| 212 (V) | ○ | ○ | ○ | ○ | ○ | ○ | | | | | | | ○ | ○ | ○ | ○ | ○ | ○ |
| 213 (V) | ○ | ○ | ○ | ○ | ○ | ○ | | | | | | | ○ | ○ | ○ | ○ | ○ | ○ |
| 210 (W) | | | | | | | | | | | | | | | | | | |
| 211 (W) | | | | | | | | | | | | | | | | | | |
| 212 (W) | | | | | | | | | | | | | | | | | | |
| 213 (W) | | | | | | | | | | | | | | | | | | |

FIG. 27

2 - LEVEL CONTROL (OUTPUT $V_0/2$): V - W LINE-TO-LINE VOLTAGE

| INTERVAL | [1] | | [2] | | [3] | | [4] | | [5] | | [6] | | [1] | | [2] | | [3] | |
|---|---|---|---|---|---|---|---|---|---|---|---|---|---|---|---|---|---|---|
| SUB-INTERVAL / SWITCHING DEVICES | A | B | A | B | A | B | A | B | A | B | A | B | A | B | A | B | A | B |
| 210 | | | | | | | | | | | | | | | | | | |
| 211 | | | | | | | | | | | | | | | | | | |
| 212 | | | | | | | | | | | | | | | | | | |
| 213 | | | | | | | | | | | | | | | | | | |
| 210 (V) | | | | | | | | | | | | | | | | | | |
| 211 (V) | O | | O | | O | | | | | | | | O | | O | | O | |
| 212 (V) | | | | | | | O | | O | | O | | | | | | | |
| 213 (V) | | | | | | | | | | | | | | | | | | |
| 210 (W) | | | | | | | O | O | O | O | O | O | | | | | | |
| 211 (W) | | | | | | | O | O | O | O | O | O | | | | | | |
| 212 (W) | O | O | O | O | O | O | | | | | | | O | O | O | O | O | O |
| 213 (W) | O | O | O | O | O | O | | | | | | | O | O | O | O | O | O |

FIG. 28

2 - LEVEL CONTROL (OUTPUT $V_0/2$): W - U LINE-TO-LINE VOLTAGE

| INTERVAL | [1] | | [2] | | [3] | | [4] | | [5] | | [6] | | [1] | | [2] | | [3] | |
|---|---|---|---|---|---|---|---|---|---|---|---|---|---|---|---|---|---|---|
| SUB-INTERVAL / SWITCHING DEVICES | A | B | A | B | A | B | A | B | A | B | A | B | A | B | A | B | A | B |
| 210 | | | | | | | O | O | O | O | O | O | | | | | | |
| 211 | | | | | | | O | O | O | O | O | O | | | | | | |
| 212 | O | O | O | O | O | O | | | | | | | O | O | O | O | O | O |
| 213 | O | O | O | O | O | O | | | | | | | O | O | O | O | O | O |
| 210 (V) | | | | | | | | | | | | | | | | | | |
| 211 (V) | | | | | | | | | | | | | | | | | | |
| 212 (V) | | | | | | | | | | | | | | | | | | |
| 213 (V) | | | | | | | | | | | | | | | | | | |
| 210 (W) | | | | | | | | | | | | | | | | | | |
| 211 (W) | O | | O | | O | | | | | | | | O | | O | | O | |
| 212 (W) | | | | | | | O | | O | | O | | | | | | | |
| 213 (W) | | | | | | | | | | | | | | | | | | |

THREE LEVEL PULSE WIDTH MODULATED INVERTER FOR AN ELECTRIC VEHICLE

This application is a Continuation-In-Part, of application Ser. No. 08/010,784, filed Jan. 29, 1993 abandoned.

FIELD OF THE INVENTION

The present invention relates to an inverter for an electric vehicle, which converts a DC voltage from a battery to an AC voltage supplied to AC motors for driving wheels of the electric vehicle.

DESCRIPTION OF THE PRIOR ART

FIG. 1 shows the main circuit of an electric vehicle. The electric vehicle employs a battery as a power supply and an inverter as a DC-to-AC converter, and its wheels are driven by AC motors which are supplied with AC power from the inverter. In this figure, reference numeral 1 designates a main battery; 2, an inverter; and 3, an AC motor for driving a wheel or wheels. The inverter 2 is a three-phase inverter, and comprises six arms, each of which includes a transistor 201 and a diode 202 connected in antiparallel fashion as shown in this figure.

A smoothing capacitor 4 is connected in parallel with the battery 1 between the battery 1 and the inverter 2. The smoothing capacitor 4 prevents higher harmonics, which are included in the input current to the inverter 2, from entering the main battery 1. In addition, it limits overvoltages induced by the switching operations of the semiconductor switches of the inverter 2.

The power train of a conventional electric vehicle usually employs a bipolar transistor as the transistors 201 of the inverter 2, and an induction motor as the motor 3. This is because they will simplify the structure, reduce the cost, and facilitate employing the conventional technology.

One of the important evaluation items of the electric vehicle is the system efficiency. It corresponds to the fuel cost of an internal combustion engine car. This system efficiency has great influence on the mileage (range) between charging.

In the electric vehicle, as in the gasoline car, the output of the motor at a constant speed of travel is small, at about a fraction of the maximum output. In addition, the duration of a constant speed drive is long. Accordingly, the system efficiency of the electric vehicle can be increased greatly by improving the efficiency in the low output operation mode. The components in the main circuit that govern the system efficiency are the motor and inverter. In view of this, the efficiency of the inverter will be considered below.

A large part of the loss produced by the inverter is the loss in the power semiconductor switching devices constituting the inverter. This loss is the sum of the stationary loss $P_{sd}$ and the switching loss $P_{sw}$. The stationary loss $P_{sd}$ is produced by the current flowing through the power semiconductor switching devices and is expressed by equation (1).

$$P_{sd}=i \times v_d (W) \quad (1)$$

where i is the current flowing through the power switching devices, and $v_d$ is the on-state voltage across the power switching devices, which is determined by the characteristics inherent in the power switching devices. The power switching devices conventionally used are bipolar transistors whose characteristics are schematically illustrated in FIG. 2. More specifically, this type of power switching device has a voltage $v_{d0}$ at the current of zero, and the on state voltage $v_d$ gradually increases with the current.

Next, the switching loss will be explained.

FIGS. 3 and 4 show typical switching operations of the power semiconductor switching devices of the inverter: FIG. 3 illustrates the switch on operation; and FIG. 4 illustrates the switch off operation. In these figures, v is a voltage across a power switching device, i is a current flowing through the power switching device, and p designates a waveform of the power loss in the power switching device.

Here, the switching loss $P_{sw}$ is expressed by the following expression.

$$P_{sw}=V_0 \times I_0 \times t_s \times f_s/6 (W) \quad (2)$$

where $t_s$ is a switching time, and $f_s$ is a switching frequency. Equation (2) holds true for both switch on and off operations.

Next, the inverter loss in the conventional system is considered.

From equation (1), it is seen that the stationary loss is approximately proportional to the current flowing through the power semiconductor switching device. This shows that the stationary loss of the inverter is proportional to the output current of the inverter, that is, to the input current to the motor. From equation (2), it is found that the switching loss is proportional to the main battery voltage and the input current to the motor because $V_0$ is nearly equal to the main battery voltage and $f_s$ is approximately constant.

As the motors for driving the electric vehicle, induction motors are commonly employed. In the induction motor, the exciting current must be supplied from the motor current.

FIG. 5 shows an example of conventional high efficiency control of an induction motor, and illustrates the relationships between the output of the motor and the voltage $V_M$ and current $I_M$ of the motor. This graph shows a method wherein the power factor of the motor are maintained approximately constant throughout the operation range of the motor.

However, since the exciting current is also required in the low output operation mode even in this method, the motor current $I_M$ is not proportional to the output (a proportional line is indicated by a dotted line). As a result, the efficiency of the motor reduces as the output of the motor decreases because the inverter loss is approximately proportional to the output current. In other words, the reduction in the efficiency might be prevented if the motor current had the characteristics as shown by the dotted line.

Next, let us consider the power train of an electric vehicle to which the inverter in accordance with the present invention is applied.

FIG. 6 is a conventional power train of an electric vehicle. The system employs a main battery, a semiconductor power converter like an inverter, and a motor in place of an engine and a transmission of an internal combustion engine car, and is one of the most widely used power trains.

In this figure, reference numeral 1 designates a battery, a block 8 enclosed by dotted lines is a drive portion of the electric vehicle corresponding to the engine and transmission of an internal combustion engine car. The drive portion 8 comprises a semiconductor power converter 81 such as an inverter, a motor 83 such as a three-phase induction motor, and a reduction gear 84. The reduction gear may have either a constant or a variable reduction gear ratio.

The power converter 81 is connected, on the one hand, to the main battery 1 via DC connecting wires 12 and a main switch, and on the other hand, to the motor 83 via AC connecting wires 85.

The motor 83 is joined to the reduction gear 84 with a shaft 86, which might be replaced by the output shaft of the motor. The output shaft 87 of the reduction gear 84 transmits the output power to a differential gear 5 via universal joints 31 and 32 and a propeller shaft 9. The differential gear 5, which is similar to that of an internal combustion engine car, transmits the power from the drive portion 8 to right and left wheels 61 and 62 via a known differential mechanism and driving axles 71 and 72.

FIG. 7 shows another conventional power train. The power train in FIG. 7 differs from that of FIG. 6 in that it does not comprise the differential gear.

In FIG. 7, the power train of the right wheel 61 comprises DC connecting wires 121, a power converter 811, AC connecting wires 851, a motor 831, a coupling shaft 861, a reduction gear 841, the output shaft 871 of the reduction gear, a universal joint 311 and the right wheel 61. This system corresponds to that of FIG. 6 comprising the DC connecting wires 12, the power converter 81, the AC connecting wires 85, the motor 83, the shaft 86, the reduction gear 84, the output shaft 87 of the reduction gear, and the universal joint 31.

Likewise, the power train of the left wheel 62 of FIG. 7 comprises DC connecting wires 122, a power converter 812, AC connecting wires 852, a motor 832, a coupling shaft 862, a reduction gear 842, the output shaft 872 of the reduction gear, a universal joint 312 and the left wheel 61.

In FIG. 7, a function corresponding to that of the differential mechanism of the differential gear 5 in FIG. 6 is implemented by separately controlling the torque and the rotation rate of the respective motors 831 and 832.

FIG. 8 illustrates a power train which directly drives the wheels without interposing reduction gears.

In FIG. 8, the power train for the front right wheel 63 comprises DC wires 123, a power converter 813, AC connecting wires 853, a motor 833, and the front right wheel 63. Here, the motor 833 is usually installed in the rim of the wheel 63. Power trains of the front left wheel, rear right wheel, and rear left wheel are similarly arranged. In FIG. 8, reference numerals 124, 125 and 126 denote DC connecting wires; 814, 815 and 816, power converters; 854, 855 and 856, AC connecting wires; and 834, 835 and 836, motors.

The power train shown in FIG. 6 has such a construction that the engine of an internal combustion engine car is replaced with the inverter and the motor. Therefore, it does not constitute an optimum power train for an electric vehicle, although traveling performance, except for mileage, may be better than an internal combustion engine car.

As a result, it is difficult to achieve a power train (1) of small size and light weight, (2) of low cost, (3) of low noise, and (4) having traveling performance comparable to that of an internal combustion engine car.

On the other hand, in the power trains as shown in FIGS. 7 and 8, since the increasing number of components of the power train is required in comparison with that of FIG. 6, the cost of the system will increase, which presents a new problem. In addition, since the right and left wheels must be separately controlled to achieve the traveling performance with a differential function, the controlling system becomes more complex than that of FIG. 6, and the detection function of faults and protective measures against those faults are needed.

Moreover, since the AC connecting wires, which are provided for connecting the power converters to the motors in FIGS. 7 and 8, generate electromagnetic noise, this also poses a new problem accompanying the reduction of the noise.

As described above, the conventional inverter system presents the following problems:

(1) Since bipolar transistors are used as the power semiconductor switching devices, the ON state voltage of the devices in a low current range cannot be reduced below a certain value. As a result, there is a certain limit in reducing the stationary loss in a low output range of the motor operation.

(2) Since the input voltage to the inverter is a main battery voltage, it is fixed. Consequently, reduction of the switching loss in the low output operation mode of the motor operation is also restricted.

SUMMARY OF THE INVENTION

It is therefore an object of the present invention to provide an inverter for an electric vehicle which can improve the system efficiency in a low output operation mode of the electric vehicle, and particularly, which can improve the system efficiency by reducing the loss produced by the inverter.

It is another object of the present invention to provide an integral type power train for an electric vehicle, which is small, light, inexpensive, low-noise, and can realize the traveling performance comparable to that of an internal combustion engine car except for the mileage.

In a first aspect of the present invention, there is provided an inverter for an electric vehicle which converts a DC voltage supplied from a main battery to an AC voltage to be supplied to a motor, the inverter compring:

dividing means for dividing the DC voltage outputted from the main battery into a first DC voltage and a second DC voltage which is higher than the first DC voltage;

first switching means for switching the first DC voltage to produce a first pulse train, the first pulse train having a pulse height equal to the first DC voltage and a base level equal to a third DC voltage lower than the second DC voltage;

second switching means for switching the second DC voltage to produce a second pulse train, the second pulse train having a pulse height equal to a difference between the second DC voltage and the first DC voltage and a base level equal to the first DC voltage; and control means for controlling switching of the first switching means and the second switching means.

Here, the first switching means and the second switching means may comprise unipolar switching devices.

The first switching means may operate in a range where output power of the inverter is lower than a predetermined value, and the second switching means may operate in a range where the output power of the inverter is higher than the predetermined value.

The second DC voltage may be $V_0$, the first DC voltage may be $V_0/2$, and the third DC voltage may be zero, where $V_0$ is the voltage of the main battery.

The control means may control switching of the first switching means and the second switching means so that a peak voltage of a fundamental wave voltage of the first pulse train and the second pulse train becomes less than $V_0/2 \sqrt{2}$.

The dividing means may comprise two capacitors connected in series across the main battery.

The inverter may comprise a three-phase bridge circuit including three sets of an upper arm and a lower arm connected in series, each of the arms comprising a first switching device and a second switching device connected in series, a first diode connected in antiparallel with the first switching device, a second switching diode connected in antiparallel with the second switching device, the inverter may further comprise three third diodes, each of which supplies the first DC voltage to the connecting point of the first and second switching devices in each of the upper arm, wherein the third diodes and the three-phase bridge except for the first switching device of each upper arm function as the first switching means, and the three-phase bridge circuit function as the second switching means.

In a second aspect of the present invention, there is provided a power train for an electric vehicle which drives wheels of the electric vehicle using power supplied from a battery, the power train comprising:

a power converter converting a DC voltage supplied from the main battery to an AC voltage;

a motor driven by the AC voltage; and a differential device connected to the output shaft of the motor, the differential device having reduction gear function;

wherein the power converter, the motor and the differential device are integrally arranged into a unit.

Here, the power converter may comprise:

dividing means for dividing the DC voltage outputted from the main battery into a first DC voltage and a second DC voltage which is higher than the first DC voltage;

first switching means for switching the first DC voltage to produce a first pulse train, the first pulse train having a pulse height equal to the first DC voltage and a base level equal to a third DC voltage lower than the second DC voltage;

second switching means for switching the second DC voltage to produce a second pulse train, the second pulse train having a pulse height equal to a difference between the second DC voltage and the first DC voltage and a base level equal to the first DC voltage; and control means for controlling switching of the first switching mean and the second switching means.

A power train for an electric vehicle may further comprise a reduction gear device connected between the motor and the differential device, the reduction gear device being integrally arranged into a unit together with the power converter, the motor and the differential device.

According to the present invention, the following advantages can be obtained.

(1) If the first, second, and third levels are determined as $V_0/2$, $V_0$ and 0, where $V_0$ is the battery voltage, the power switching devices having a low withstanding voltage $V_0/2$ can be employed. This makes it possible to reduce the ON state voltage of the power switching devices in comparison with a conventional inverter which requires power switching devices whose withstanding voltage is $V_0$.

(2) Since the power switching devices of the inverter switch a first voltage or the difference voltage of the first and second voltages (both voltages are typically $V_0/2$) lower than that of a conventional inverter ($V_0$), the switching loss of the power switching devices is reduced, and hence, the loss of the inverter is also reduced.

(3) Unipolar switching device will further reduce the stationary loss of the switching devices in a low output power operation mode because the ON state voltage is approximately directly proportional to the current passing through the power switching devices, and hence, the stationary loss is approximately directly proportional to the square of the current.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 23–25 are tables showing the switching operation of the devices for 3-level mode of operation.

FIGS. 26–28 are tables showing the switching operation of the 2-level mode of operation.

DETAILED DESCRIPTION OF PREFERRED EMBODIMENTS

The invention will now be described with reference to the accompanying drawings.

Figure 9:
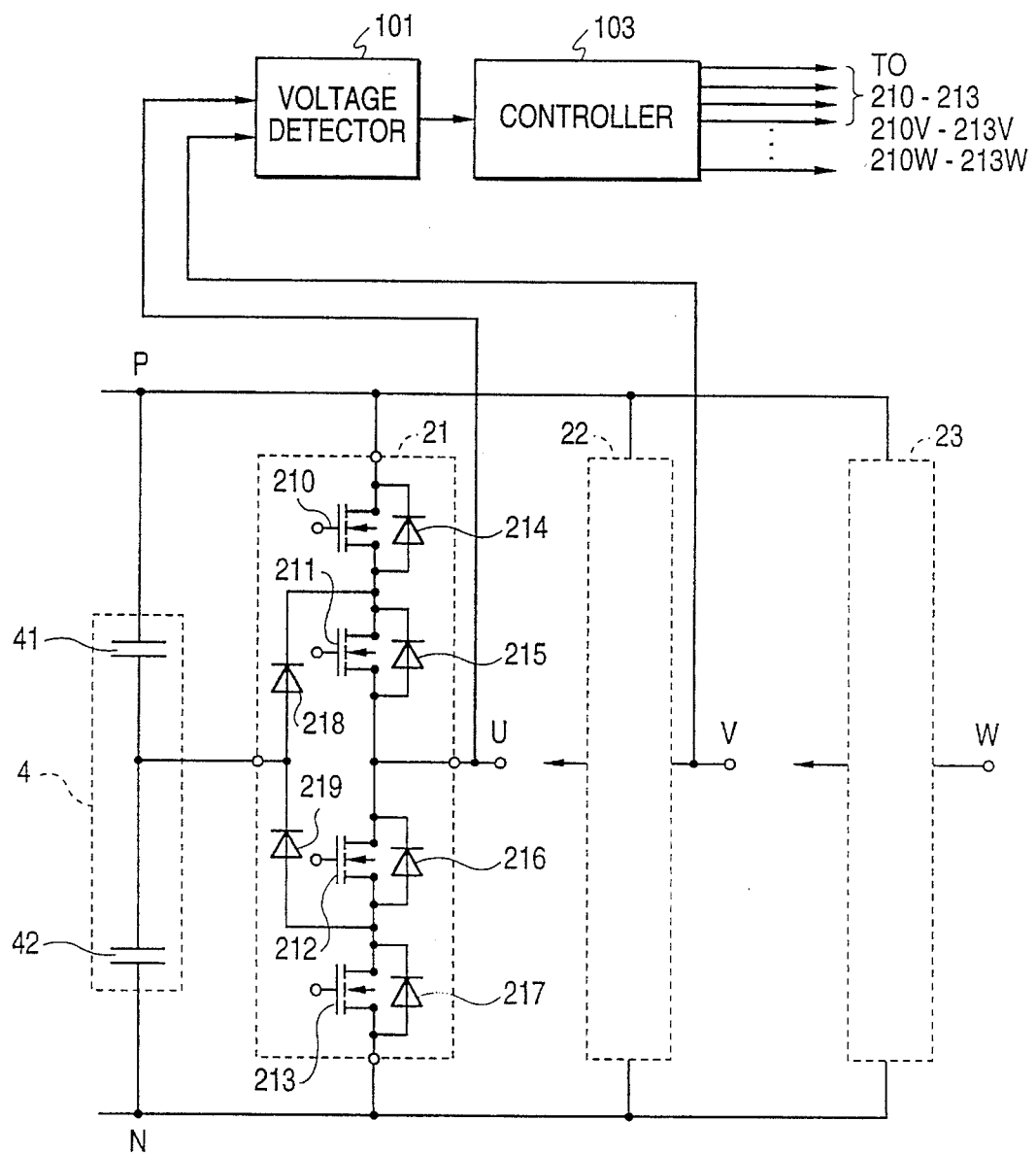
FIG. 9 is a circuit diagram showing a first embodiment of an inverter for an electric vehicle in accordance with the present invention.

FIG. 9 shows a first embodiment of the present invention, wherein the contents of the V and W phases of the inverter main circuit is omitted. The arrangement of FIG. 9 corresponds to the inverter 2 and the smoothing capacitor 4 stated before with reference to FIG. 1, and hence, the entire system can be constructed by connecting the main battery 1 and the motor 3 to the arrangement of FIG. 9.

Figure 1:
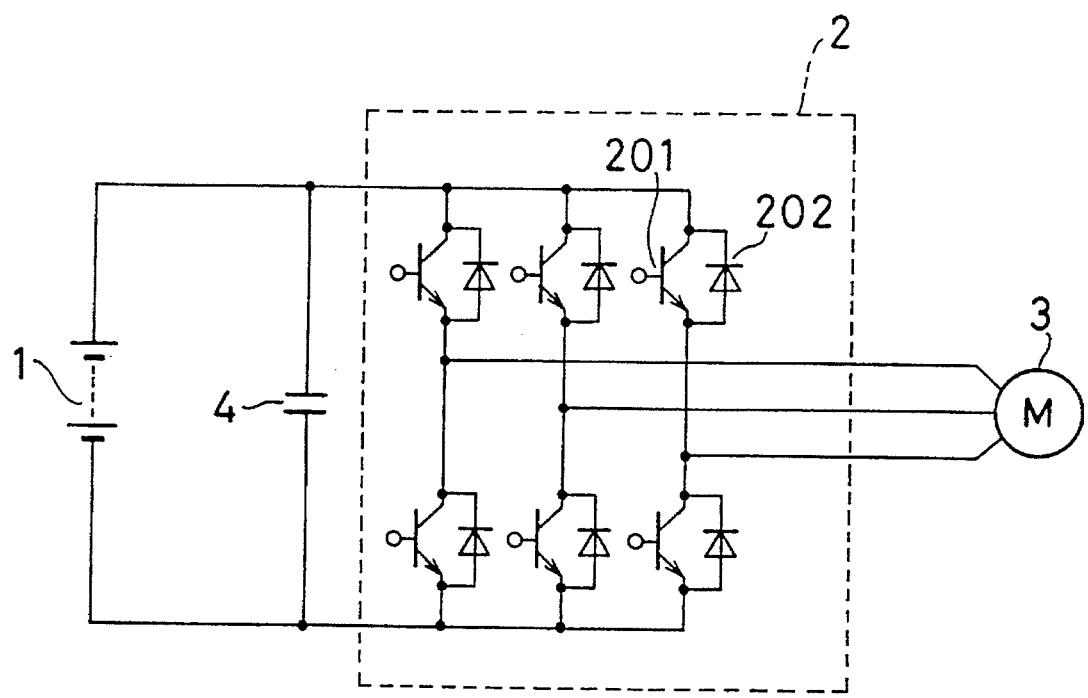
FIG. 1 is a circuit diagram showing a main circuit of a conventional electric vehicle.
Figure 2:
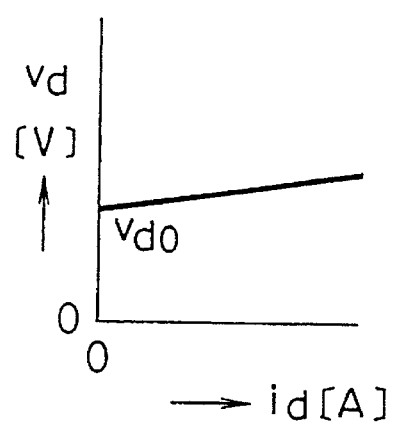
FIG. 2 is a graph illustrating a relationship between the current $i_d$ and the ON state voltage $v_d$ of a bipolar power switching device.
Figure 3:
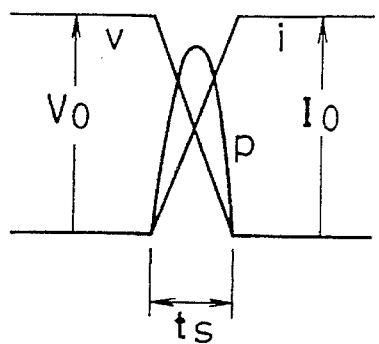
FIG. 3 is a diagram illustrating waveforms at a turn-on operation of a power switching device of an inverter.
Figure 4:
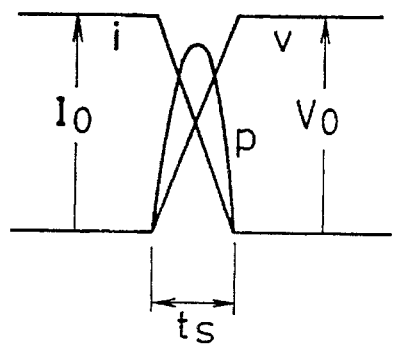
FIG. 4 is a diagram illustrating waveforms at a turn-off operation of a power switching device of an inverter.
Figure 5:
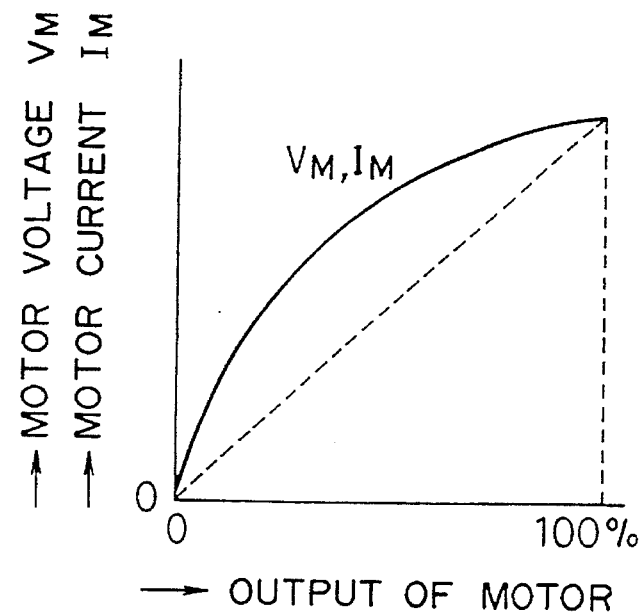
FIG. 5 is a graph illustrating the relationships between the output power of an induction motor and a motor current, and the output power and a motor voltage.
Figure 6:
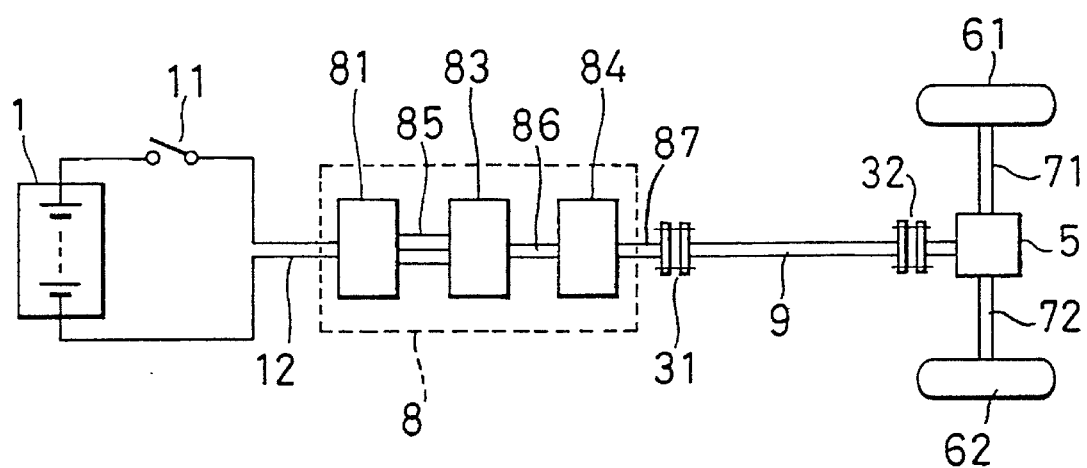
FIG. 6 is a block diagram showing a power train of a conventional electric vehicle.

In FIG. 9, two capacitors 41 and 42 connected in series constitute a smoothing capacitor 4 which is substantially the same as the smoothing capacitor 4 in FIG. 1.

Since three inverter arms 21–23 have the same construction, only the inverter arm 21 of the U phase is explained here. In the inverter arm 21, four power semiconductor switching devices 210–213, which are unipolar power switching devices such as a power MOSFET or the like, are connected in series in the same polarization. An AC output terminal U is provided at the connecting point of the power switching devices 211 and 212 so that the AC output of the U-phase is produced from this terminal U. The power switching device 210 is connected to the positive terminal P of the DC source, whereas the power switching device 213 is connected to the negative terminal N thereof.

Current feedback diodes 214–217 are connected with the power switching devices 210–213 in antiparallel fashion. Diodes 218 and 219 are connected in series as shown in this figure so that the cathode terminal of the diode 218 is connected to the connecting point of the power switching devices 210 and 211, whereas the anode terminal of the diode 219 is connected to the connecting point of the power switching devices 212 and 213. The connecting point of the diodes 218 and 219 are connected to the connecting point of the capacitors 41 and 42.

Power switching devices 210–213 constitute switching elements 1–4, respectively. Further, diodes 218–219 constitute diodes 1 and 2, respectively. While not illustrated in detail in FIG. 9, inverter arms 22 and 23 have corresponding arrangements of power switching devices and diodes as shown in inverter arm 21. In inverter arm 22, power switching devices 210V–213V constitute switching devices 5–8, respectively, and diodes 218V–219V constitute diodes 4 and 5, respectively. In inverter arm 23 switching devices 210W–213W constitute power switching devices 9–12, respectively, and diodes 218W and 219W constitute diodes 5 and 6, respectively.

The inverter is controlled by a controller 103 to be in the 2-level (lower power output) mode of operation when the line-to-line voltage detected by detector 101 is lower than a pre-determined reference voltage. On the other hand, controller 103 controls the inverter to be in the 3-level (high power output) mode of operation when the line-to-line voltage detected by detector 101 is higher than the pre-determined reference voltage.

Next, the operation of this embodiment will be described.

Figure 10:
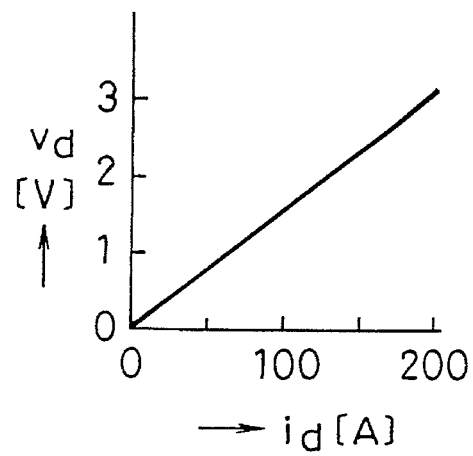
FIG. 10 is a graph illustrating the relationship between the ON state voltage and the current of a power MOSFET.

First, FIG. 10 illustrates a voltage-current characteristics of the power MOSFET used as the power switching devices 210–213, which exhibits approximately resistive characteristics.

Figure 11:
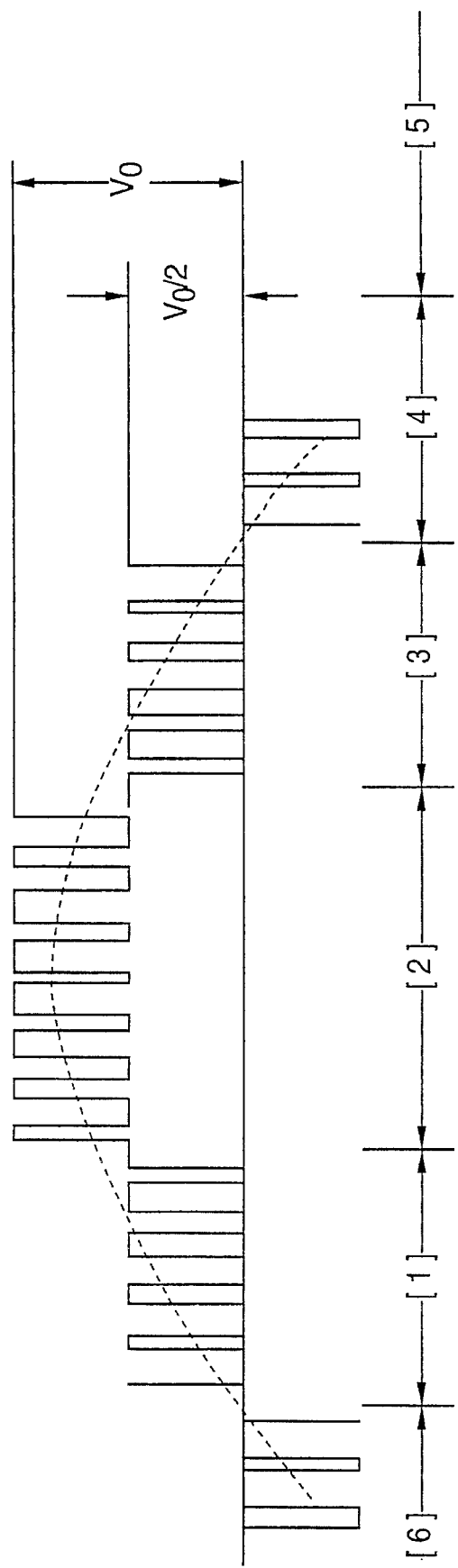
FIG. 11 is a diagram illustrating a waveform of the output voltage of the inverter of FIG. 9 in a high output power operation mode.

FIGS. 11–18 illustrate the operation of this embodiment. FIG. 11 shows an output voltage waveform (the line-to-line voltage waveform) of the inverter during a high power output (or a high and middle power output). In this figure, the dotted line indicates the waveform of the fundamental voltage of the motor. To obtain the fundamental voltage, the following control is achieved: during the intervals [1] and [3] in the half cycle, the output voltage of the inverter is produced in the form of PWM pulses whose height is half the main battery voltage $V_0/2$ and whose base level is zero Volt; on the other hand, during the middle interval [2] in the half cycle, the output voltage is produced in the form of PWM pulses whose height is half the main battery voltage $V_0/2$ and whose base level is half the main battery voltage $V_0/2$. In other words, the inverter operates as a three-level inverter.

Figure 12:
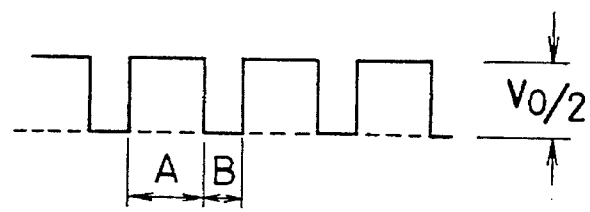
FIG. 12 is a diagram illustrating a waveform of the output voltage of the inverter of FIG. 9 in the intervals [1] and [3] of FIG. 11.
Figure 13:
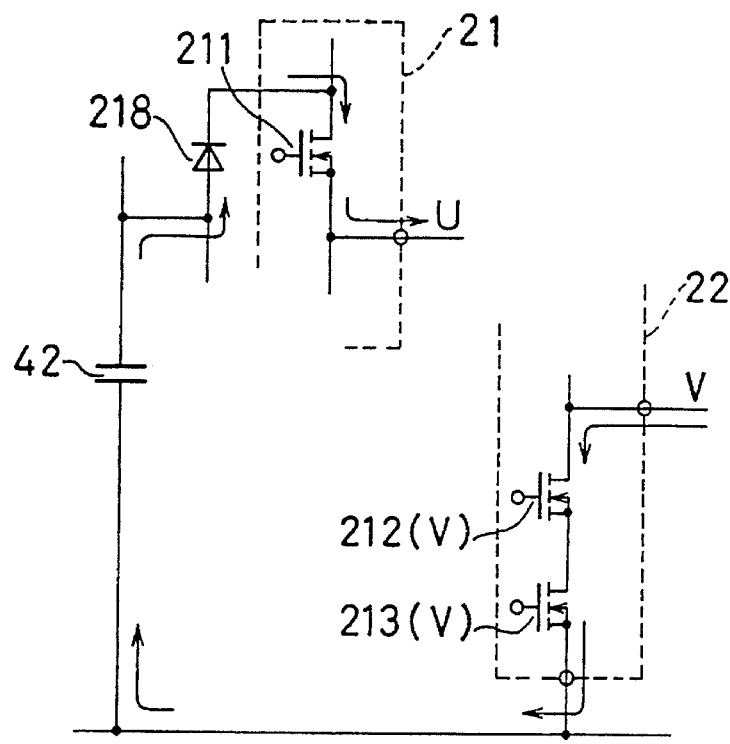
FIGS. 13 and 14 are diagrams illustrating the operation of the inverter of FIG. 9 in the intervals [1] and [3]
Figure 14:
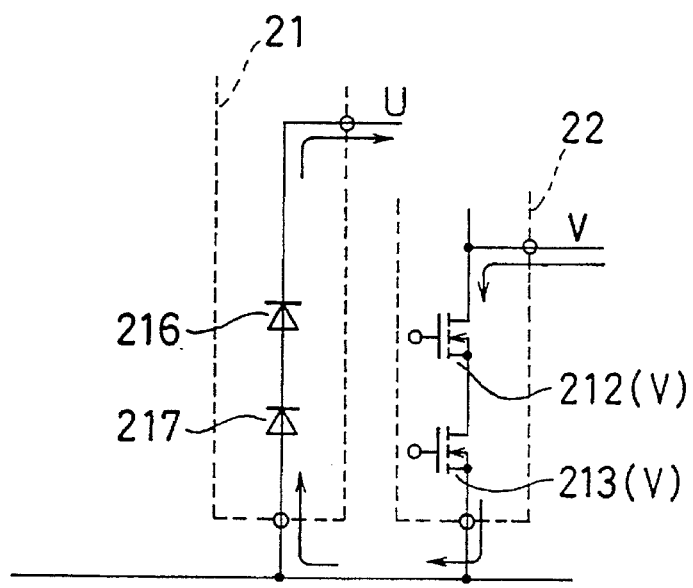

FIGS. 12–14 illustrate the operation to obtain the PWM pulses during the intervals [1] and [3].

FIG. 12 illustrates the waveform of the output voltage (the line-to-line voltage) of the inverter wherein A designates the interval during which half the main battery voltage $V_0/2$ is outputted, and B denotes the interval during which the voltage is zero.

FIG. 13 illustrates the operation of the power switching devices of the U-V phases during the subinterval A of FIG. 12. In FIG. 13, reference numeral 212 (V) designates the power switching device in the V-phase, which is the counterpart of the power switching device 212 in the U-phase, and reference numeral 213(V) designates the power switching device in the V-phase, which is the counterpart of the power switching device 213 in the U-phase.

During the subinterval A of FIG. 12, the power switching devices 211, 212 (V) and 213(V) are closed. By this, the voltage across the capacitor 42 (that is, $V_0/2$) is added between the output terminals U-V via the diode 218. In this state, it is assumed that the current is flowing in the direction indicated by the arrows in FIG. 13. Subsequently, when the power switching device 211 is opened, a new current passage will be established as shown in FIG. 14. The passage passes through the output terminal V, the power switching device 212(V), the power switching device 213(V), the diode 217, the diode 216 and the output terminal U so that the voltage between the output terminals U-V becomes zero as in the subinterval B of FIG. 12.

Next, the operation during the interval [2] of FIG. 11 will be described with reference to FIGS. 15–17.

Figure 15:
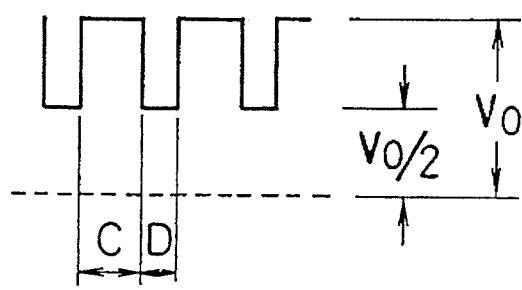
FIG. 15 is a diagram illustrating a waveform of the output voltage of the inverter of FIG. 9 in the interval [2] of FIG. 11.

FIG. 15 illustrates the waveform of the output voltage of the inverter (line-to-line voltage), wherein C designates the subinterval during which the main battery voltage $V_0$ is outputted, and D denotes the subinterval during which half the main battery voltage $V_0/2$ is outputted.

Figure 16:
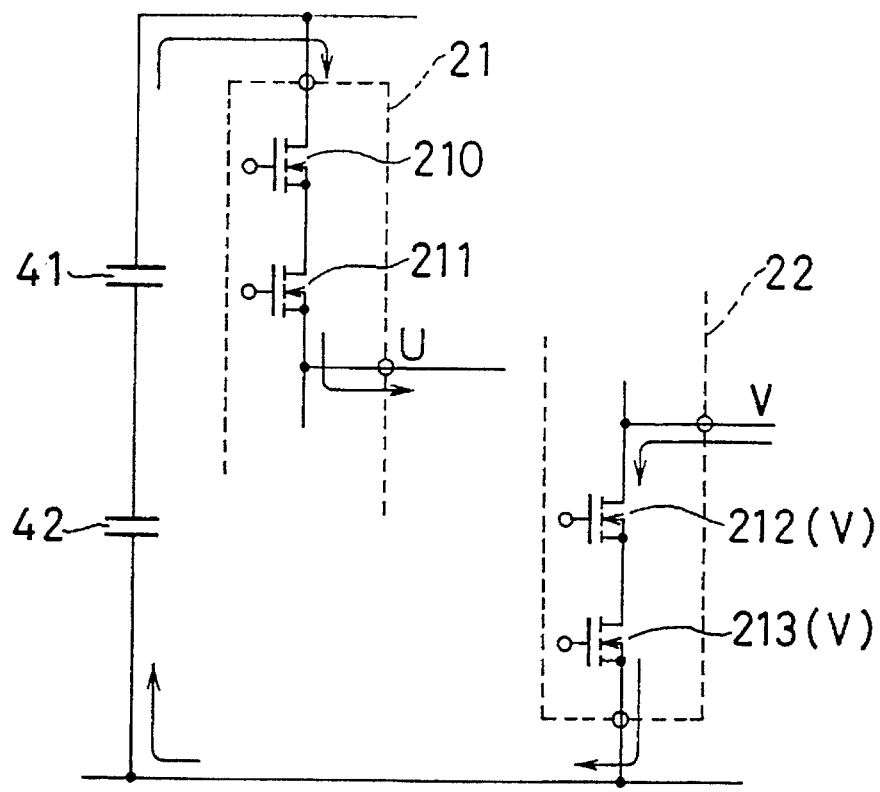
FIGS. 16 and 17 are diagrams illustrating the operation of the inverter of FIG. 9 in the interval [2]
Figure 17:
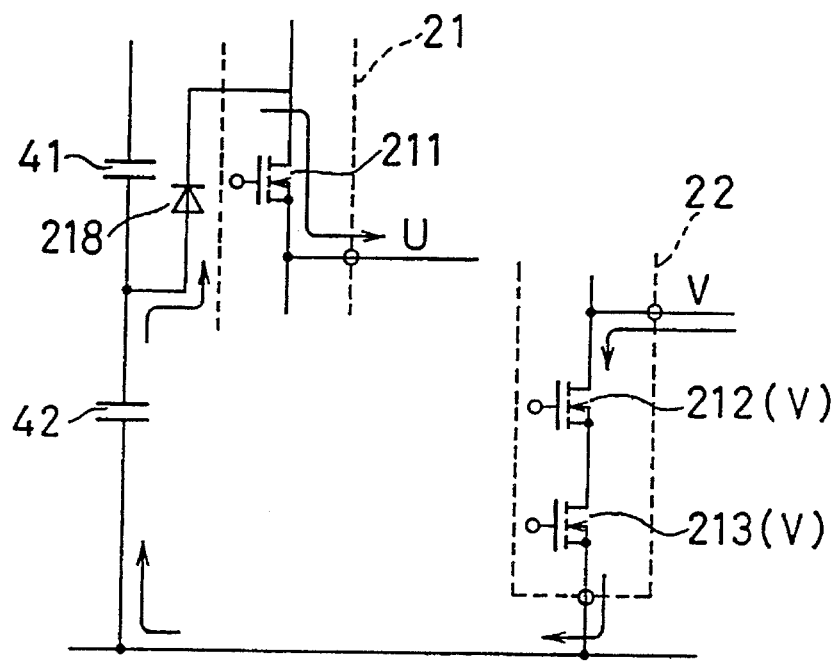

FIG. 16 illustrates the operation of the power switching devices during the subinterval C in a manner similar to FIG. 13 wherein the operation during the subinterval A is illustrated. During the interval C, the power switching devices 210, 211, 212 (V) and 213(V) are all closed so that the voltage across the two capacitors 41 and 42 (that is, $V_0$) is applied between the output terminals U-V. In this state, it is assumed that the current is flowing as indicated by the arrows of FIG. 16. Subsequently, when the power switching device 210 is opened, a new current passage is established as shown in FIG. 17: the current flows through the capacitor 42, the diode 218, the power switching device 211, and the output terminal U so that the voltage across the capacitor 42 (that is, $V_0/2$) is applied between the output terminals U and V via the diode 218.

Figure 18:
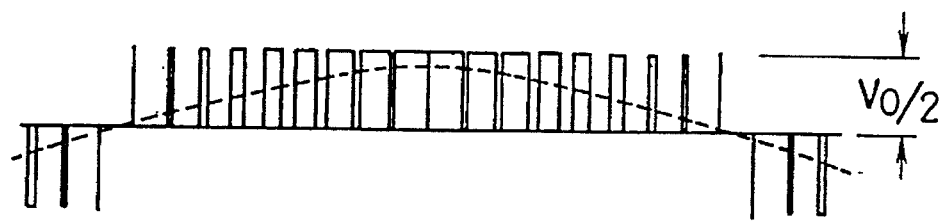
FIG. 18 is a diagram illustrating a waveform of the output voltage of the inverter of FIG. 9 in a low output power operation mode.

FIG. 18 illustrates the waveform of the output voltage (line-to-line voltage) of the inverter when the motor is operated in a low output operation mode. The voltage waveform is a PWM waveform whose height is $V_o/2$ and whose base level is zero. In this case, the operation of the power switching devices of the inverter is similar to that of the intervals [1] and [3] of FIG. 11. Thus, in the 2-level mode of operation, controller 103 turns on and off the second, seventh and eighth power switching devices at the same time to produce a positive portion of the line-to-line voltage between the U-phase output terminal and the V-phase output terminal. To produce the negative portion of the line-to-line voltage between the U-phase output terminal and the V-phase output terminal in the 2-level mode, controller 103 turns on and off the third, fifth and sixth power switching devices at the same time. The other line-to-line voltages in the 2-level mode are produced in a corresponding manner.

The dotted line shown in FIG. 18 shows a fundamental waveform of the line-to-line voltage of the motor whose effective value $V_{me}$ is expressed by the following Equation (3).

$$V_{me} = \sqrt{3}\ V_o/4\ \sqrt{Z} \qquad (3)$$

The output voltage of the inverter can take a waveform as shown in FIG. 18 in a range where the motor voltage is smaller than the effective value $V_{me}$.

FIGS. 23 to 28 comprise tables which reflect the switching of the power switching devices in each arm U, V and W of a three-phase inverter to achieve the desired line-to-line voltage for 2 and 3 level control. In these tables, intervals [1]–[6] are as shown in FIG. 11. The tables in FIGS. 23–25 show the power switching devices that are turned on (denoted by 0 in the box) and those that are turned off (box is blank) for each sub-interval A-D in the six intervals of 3-level control for the U-V, V-W and W-U line-to-line voltages, respectively. Similarly, the tables in FIGS. 26–28 show the power switching elements that are turned on and those that we turned off for the sub-intervals A and B in the six intervals of 2-level contact for the U-V, V-W and W-U line-to-line voltages, respectively.

Although it is supposed that the motor driven by the inverter in accordance with the present invention is an induction motor in this embodiment, a synchronous motor can also be applied to the present invention.

Furthermore, the present invention can be applied not only to three-phase inverters but also to multi-phase inverters.

Next, preferred examples of the power train in accordance with the present invention will be described below.

EMBODIMENT 2

Figure 19:
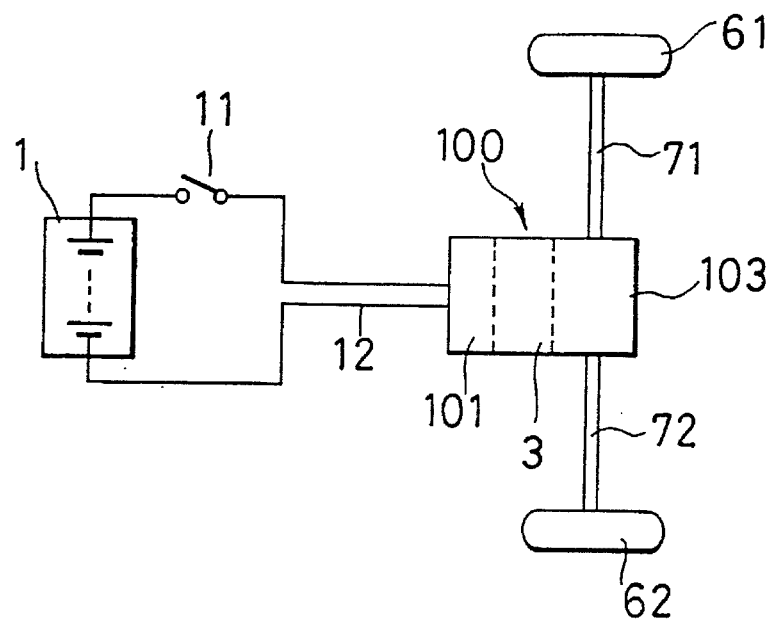
FIG. 19 is a block diagram showing the arrangement of an embodiment of a driving unit in accordance with the present invention.

FIG. 19 is a first example of a power train which integrates a semiconductor power converter, a motor and a differential gear into a unit. Here, the semiconductor power converter comprises an inverter in accordance with the present invention, and the differential gear is provided with a reduction function. Driving of wheels is accomplished by driving the motor by the power converter, and by transmitting the power of the motor to the right and left wheels via the differential gear having the reduction function.

More specifically, in FIG. 19, a driving unit 100 integrally incorporating the power train comprises a power converter 101, a motor 3 and a differential gear 103 having a reduction function.

The motor 3 is an AC motor whose output shaft is joined to the input shaft of the differential gear 103. The power converter 101 comprises the inverter in accordance with the present invention. The inverter incorporates its controller.

The power converter 101 is connected to the motor 3 by directly connecting their terminals with each other, or by connecting the terminals with shortest wires in the driving unit 100.

The differential gear 103 is similar to a differential gear employed by a conventional electric vehicle except that the differential gear 103 has a greater reduction gear ratio than the conventional one so that it is provided with a reduction function. The output shaft of the differential gear 103 is joined to the right and left wheels 61 and 62 via the wheel axles 71 and 72 so that they drive the wheels 61 and 62.

Figure 20:
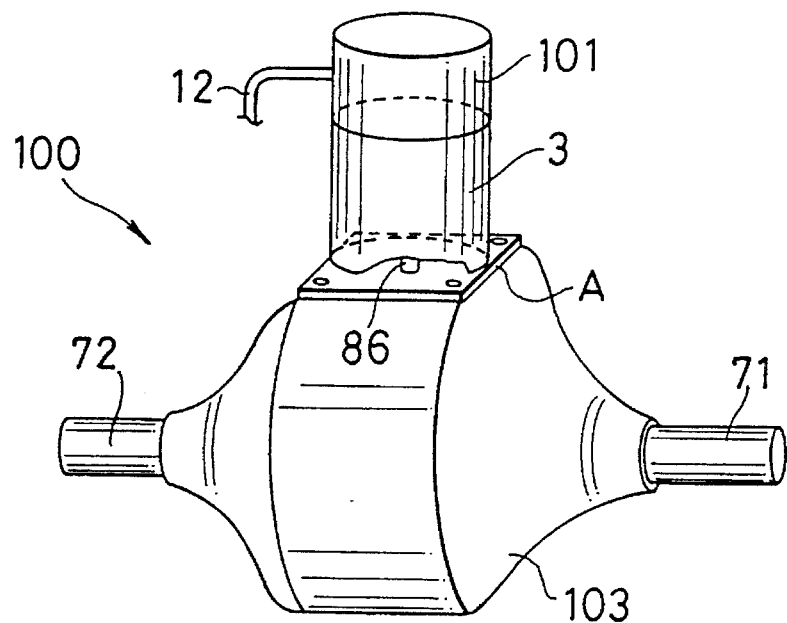
FIG. 20 is a perspective view showing the driving unit of FIG. 19.

FIG. 20 is a perspective view of the driving unit 100. A portion of a casing of the differential gear 103 is made a mounting portion A on which a unit integrally incorporating the power converter 101 and the motor 3 in a frame made of metal is mounted. Thus, the integral structure comprising the power converter 101, the motor 3 and the differential gear 103 constitutes the driving unit 100. The output shaft 86 of the motor 3 is joined to the input shaft of the differential gear 103 inside the casing.

EMBODIMENT 3

Figure 21:
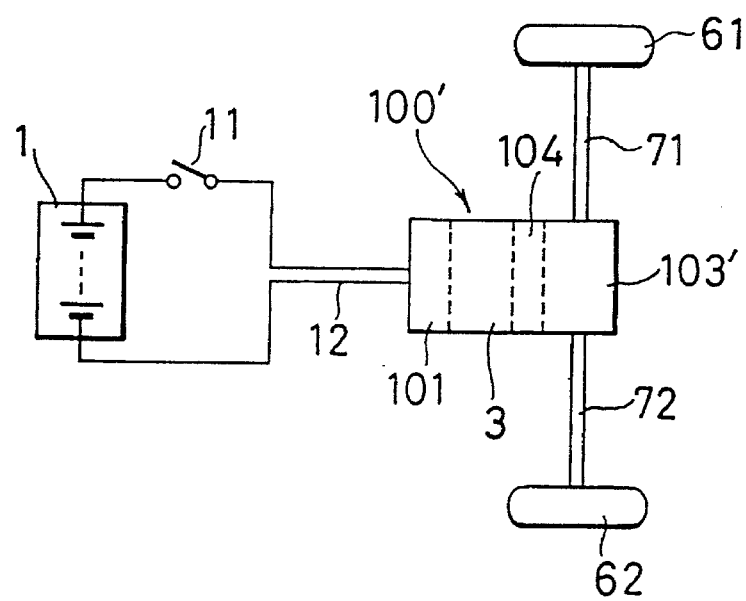
FIG. 21 is a block diagram showing the arrangement of another embodiment of a driving unit in accordance with the present invention.

FIG. 21 is a second example of the power train in accordance with the present invention, which comprises a reduction gear 104 in the driving unit in the case where the reduction gear ratio of the reduction gear 103 in the power train of FIG. 19 is insufficient.

In other words, the power train of FIG. 21 comprises a semiconductor power converter including the inverter in accordance with the present invention, a motor, a reduction gear, and a differential gear, which are constructed into an integral structure.

Figure 22:
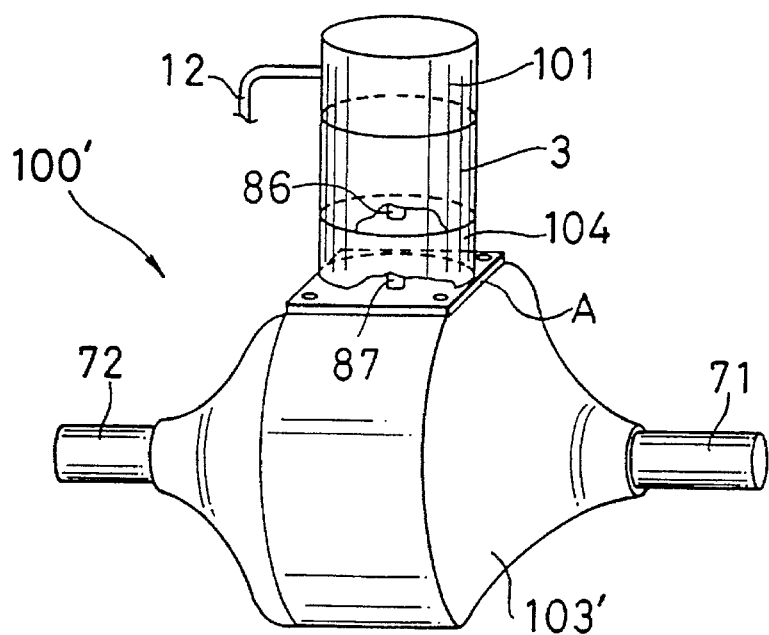
FIG. 22 is a perspective view showing the driving unit of FIG. 21.

More specifically, as shown in FIG. 22, the power converter 101, the motor 3 and the reduction gear 104 are integrally mounted on the mounting portion A provided on a part of a casing of a differential gear 103'. All these components are arranged into an integral structure to constitute a driving unit 100' as shown in FIG. 22. Here, the output shaft of the motor 3 is joined to the input shaft of the reduction gear 104 inside the casing. Likewise, the output shaft 87 of the reduction gear 104 is joined to the input shaft of the differential gear 103' inside the casing.

The power trains as shown in FIGS. 19 and 22 are formed as a driving unit which incorporates the power train of an electric vehicle into an integral structure. Thus, a small, light, low cost power train can be implemented.

In addition, since the power converter like an inverter, and the motor are integrated, they can share a cooling device so that the cooling system can be simplified, thereby resulting in further reduction in cost and the improvement in efficiency. Further, since the wires connecting the power converter to the motor as the AC connecting wires can be obviated or made shortest, electromagnetic faults caused by noise generated by the connecting wires are remarkably reduced.

Moreover, since the electric leads pulled out of the casing consist of only DC connecting wires, and all the components of the driving unit can be covered by the casing made of metal, the electromagnetic faults caused by these components will be greatly reduced.

Figure 7:
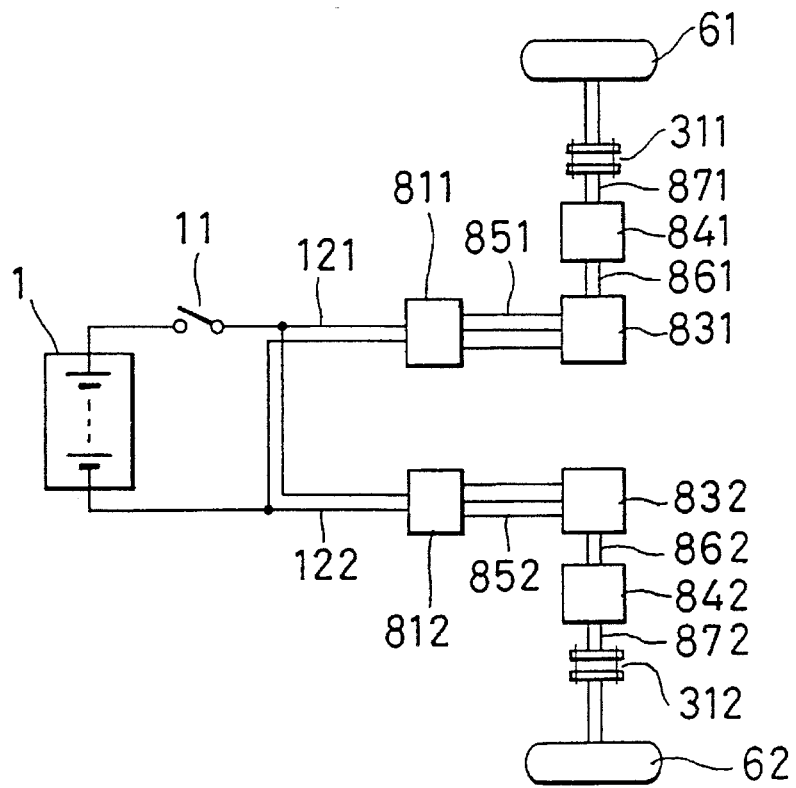
FIG. 7 is a block diagram showing another power train of a conventional electric vehicle.
Figure 8:
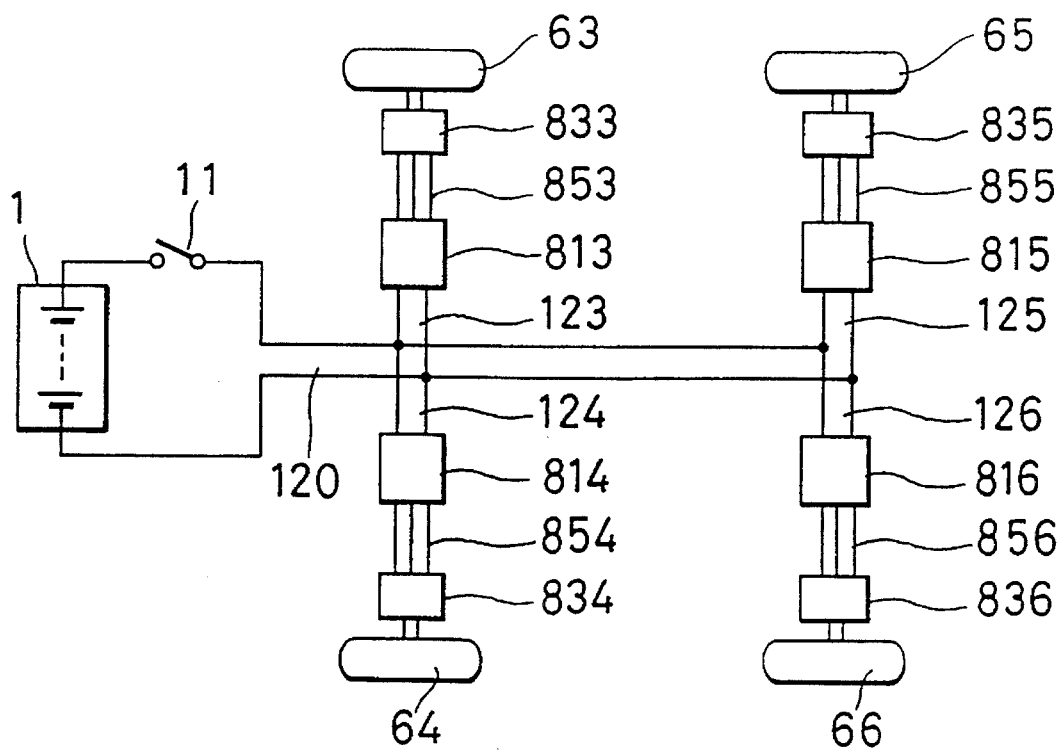
FIG. 8 is a block diagram showing still another power train of a conventional electric vehicle.

In addition, the power train, the power converter and the motor control system can be simplified in comparison with the conventional systems as shown in FIGS. 7 and 8 wherein each wheel is separately driven because all the power trains of the present invention comprise the differential gear. Moreover, a steering performance similar to that of an internal combustion engine car can be obtained.

Although specific embodiments of an inverter for an electric vehicle constructed in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An inverter for an electric vehicle which converts a DC voltage supplied from a main battery having a voltage $V_0$ to an AC voltage to be supplied to a motor, said inverter comprising:

a voltage divider connectable to the main battery and having three output terminals including a first terminal, a second terminal and a middle terminal, said voltage divider producing a voltage of $V_0/2$ across the first terminal and the middle terminal, and a voltage $V_0/2$ across the second terminal and the middle terminal;

a first upper arm including a first switching device and a second switching device;

a first lower arm including a third switching device and a fourth switching device, said first, second, third and fourth switching devices being connected in series, and a connecting point of said second and third switching devices being connected to a U-phase output line;

a second upper arm including a fifth switching device and a sixth switching device;

a second lower arm including a seventh switching device and an eighth switching device, said fifth, sixth, seventh and eighth switching device being connected in series, and a connecting point of said sixth and seventh switching devices being connected to a V-phase output line;

a third upper arm including a ninth switching device and a tenth switching element;

a third lower arm including a eleventh switching device and a twelfth switching device, said ninth, tenth, eleventh and twelfth switching device being connected in series, and a connecting point of said tenth and eleventh switching devices being connected to a W-phase output line;

a first diode connected between the middle terminal of said voltage divider and a connecting point of said first and second switching devices;

a second diode connected between the middle terminal of said voltage divider and a connecting point of said third and fourth switching devices;

a third diode connected between the middle terminal of said voltage divider and a connecting point of said fifth and sixth switching devices;

a fourth diode connected between the middle terminal of said voltage divider and a connecting point of said seventh and eighth switching devices;

a fifth diode connected between the middle terminal of said voltage divider and a connecting point of said ninth and tenth switching devices;

a sixth diode connected between the middle terminal of said voltage divider and a connecting point of said eleventh and twelfth switching devices;

detecting means for detecting a voltage across two output lines of said inverter; and control means for pulse width modulation control switching of said first to twelfth switching devices for selectively controlling the line-to-line voltages of said inverter for a two-level mode or a three-level mode of operation, said line-to-line voltage being $\pm V_0/2$ and 0 in said two-level mode, and being $\pm V_0$, $+V_0/2$ and 0 in said three-level mode, said control means being responsive to said detecting means for controlling said inverter to be in the two-level mode of operation when the line-to-line voltage detected by said detecting means is lower than a predetermined reference voltage, and to be in the three-level mode when the line-to-line voltage detected by said detecting means is higher than the predetermined reference voltage.

2. The inverter as claimed in claim 1, wherein said control means turns on and off said second, seventh and eighth switching devices at the same time to produce a positive portion of said line-to-line voltage between said U-phase output terminal and said V-phase output terminal, and turns on and off said third, fifth and sixth switching devices at the same time to produce a negative portion of said line-to-line voltage between said U-phase output terminal and said V-phase output terminal in said two-level mode.

3. The inverter as claimed in claim 1, wherein said control means controls said first to twelfth switching devices so that an effective voltage of a fundamental wave of a line-to-line voltage of said inverter is less than $\sqrt{3}V_0/(4\sqrt{2})$.

4. The inverter as claimed in claim 1, wherein said voltage divider comprises two capacitors connected in series across the main battery.

\* \* \* \* \*